United States Patent
Tsai et al.

(10) Patent No.: US 8,964,991 B2
(45) Date of Patent: Feb. 24, 2015

(54) METHOD FOR PROCESSING AN INPUT COMPOSITE SIGNAL AND SIGNAL PROCESSING APPARATUS THEREOF

(75) Inventors: Tien-Ju Tsai, Tainan County (TW); Chih-Feng Lin, Tainan County (TW)

(73) Assignee: Himax Tehnologies Limted, Fonghua Village, Xinshi Dist., Tainan (TW)

( * ) Notice: Subject to any disclaimer, the term of this patent is extended or adjusted under 35 U.S.C. 154(b) by 2018 days.

(21) Appl. No.: 12/141,073

(22) Filed: Jun. 17, 2008

(65) Prior Publication Data

US 2009/0310791 A1     Dec. 17, 2009

(51) Int. Cl.
*H04H 20/48*     (2008.01)
*H04N 5/60*     (2006.01)
*H04H 40/81*     (2008.01)
*H04N 21/43*     (2011.01)
*H04N 21/439*     (2011.01)

(52) U.S. Cl.
CPC ............. *H04N 5/60* (2013.01); *H04H 40/81* (2013.01); *H04N 21/4305* (2013.01); *H04N 21/439* (2013.01); *H04N 21/4394* (2013.01)
USPC ............................................................ 381/7

(58) Field of Classification Search
USPC ............................................................ 381/7
See application file for complete search history.

(56) References Cited

U.S. PATENT DOCUMENTS

| | | | | |
|---|---|---|---|---|
| 4,399,325 | A * | 8/1983 | Tanaka et al. | 381/11 |
| 4,419,541 | A * | 12/1983 | Kishi et al. | 381/7 |
| 4,489,430 | A * | 12/1984 | Ishida et al. | 381/7 |
| 4,688,253 | A * | 8/1987 | Gumm | 381/7 |
| 5,229,891 | A * | 7/1993 | Yoshimura et al. | 360/18 |
| 5,357,544 | A * | 10/1994 | Horner et al. | 375/340 |
| 5,629,814 | A * | 5/1997 | Mok | 360/77.14 |
| 6,411,659 | B1 * | 6/2002 | Liu et al. | 375/326 |
| 6,901,146 | B1 * | 5/2005 | Taura et al. | 381/3 |
| 7,079,657 | B2 * | 7/2006 | Wu et al. | 381/2 |
| 7,437,135 | B2 * | 10/2008 | Pan et al. | 455/284 |

* cited by examiner

*Primary Examiner* — Fernando L Toledo
*Assistant Examiner* — Neil Prasad
(74) *Attorney, Agent, or Firm* — Winston Hsu; Scott Margo

(57) ABSTRACT

A method for processing an input composite signal includes tracking a signal component of the input composite signal according to a frequency of a pilot signal to generate a locked signal, detecting an amplitude of the signal component to generate a detecting result, and generating a reproduced pilot signal according to the detecting result and the locked signal. A frequency and a phase of the locked signal are substantially identical to the frequency and a phase of the pilot signal.

23 Claims, 12 Drawing Sheets

4A

4B

| Audio Standard | A2-B/G, A2-D/K | | A2-M | | EIAJ | |
|---|---|---|---|---|---|---|
| Reference Clock | $CLK_{R1}$ (2*fH) | $CLK_{R2}$ (7*fH) | $CLK_{R1}$ (2*fH) | $CLK_{R2}$ (7*fH) | $CLK_{R1}$ (2*fH) | $CLK_{R2}$ (7*fH) |
| $N_1$ | 133 | 465/466 | 105 | 367/368 | 16 | 56 |
| $N_2$ | 57 | 199/200 | 57 | 199/200 | 17 | 60 |

FIG. 12

METHOD FOR PROCESSING AN INPUT COMPOSITE SIGNAL AND SIGNAL PROCESSING APPARATUS THEREOF

BACKGROUND OF THE INVENTION

1. Field of the Invention

The present invention relates to a pilot recovery and audio mode detection mechanism, and more particularly, to a pilot recovery and audio mode detection mechanism implemented by a statistics algorithm.

2. Description of the Prior Art

Currently existing audio standards, such as audio parts of analog modulated TV systems (e.g., NTSC, PAL, and SECAM) or FM radio, have evolved from a single-channel playing mode into a multi-channel playing mode supporting stereo and bilingual modes. In order to achieve such a goal, different ways are adopted in different audio standards (e.g., BTSC, EIAJ, A2, or FM radio). But the similarity between them is that a pilot signal is modulated by a predetermined control signal and then added into signals at a transmitter to tell a receiver which audio mode has been adopted. Correspondingly, the receiver must have a mechanism for receiving and synchronizing the pilot signal and simultaneously decoding the predetermined control signal to determine the adopted audio mode.

Traditionally, a mechanism for synchronizing the pilot signal and detecting the audio mode is implemented by an analog phase-locked loop (PLL) in conjunction with an AM decoder. But drawbacks of this approach are that reliability of its detecting result often varies with environment temperature and time. In some documents, detecting audio mode is implemented by an all-digital phase-locked loop (ADPLL) in conjunction with a band-pass filter and an energy detector, but this suffers from higher costs. Hence, how to overcome such drawbacks under low operations becomes an important topic of the field.

SUMMARY OF THE INVENTION

It is one of the objectives of the claimed invention to provide a method for processing an input composite signal and related signal processing apparatus to solve the above-mentioned problems.

A method for processing an input composite signal is provided by the present invention. The method includes tracking a signal component of the input composite signal according to a frequency of a pilot signal to generate a locked signal, detecting an amplitude of the signal component to generate a detecting result, and generating a reproduced pilot signal according to the detecting result and the locked signal, wherein a frequency and a phase of the locked signal are substantially identical to the frequency and a phase of the pilot signal.

In one embodiment, the input composite signal complies with a Broadcast Television System Committee (BTSC) standard, an FM radio standard, an Electronic Industries Association of Japan (EIAJ) standard, or an audio carrier-2 (A2) standard.

A method for processing an input composite signal is provided in the present invention. The method includes tracking a signal component of the input composite signal according to a frequency of a pilot signal to generate a locked signal, performing a mixing operation according to the input composite signal and the locked signal to generate a mixed signal, and detecting an audio mode of the input composite signal according to the mixed signal, wherein a frequency and a phase of the locked signal are substantially identical to the frequency and a phase of the pilot signal.

A signal processing apparatus for processing an input composite signal is provided in the present invention. The signal processing apparatus includes a signal tracking element and a pilot reproduction element. The signal tracking element is used for tracking a signal component of the input composite signal according to a frequency of a pilot signal to generate a locked signal, wherein a frequency and a phase of the locked signal are substantially identical to the frequency and a phase of the pilot signal. The pilot reproduction element includes an amplitude detecting module and a pilot reproducing module. The amplitude detecting module is used for detecting an amplitude of the signal component to generate a detecting result. The pilot reproducing module is coupled to the signal tracking element and to the amplitude detecting module for generating a reproduced pilot signal according to the detecting result and the locked signal.

A signal processing apparatus for processing an input composite signal is provided in the present invention. The signal processing apparatus includes a signal tracking element, a mixer, and an audio mode detection element. The signal tracking element is used for tracking a signal component of the input composite signal according to a frequency of a pilot signal to generate a locked signal, wherein a frequency and a phase of the locked signal are substantially identical to the frequency and a phase of the pilot signal. The mixer is coupled to the input composite signal and to the signal tracking module for performing a mixing operation according to the input composite signal and the locked signal to generate a mixed signal. The audio mode detection element is coupled to the input composite signal and to the mixer for detecting an audio mode of the input composite signal according to the mixed signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 is a parameter table illustrating each parameter of different audio modes in different standards.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
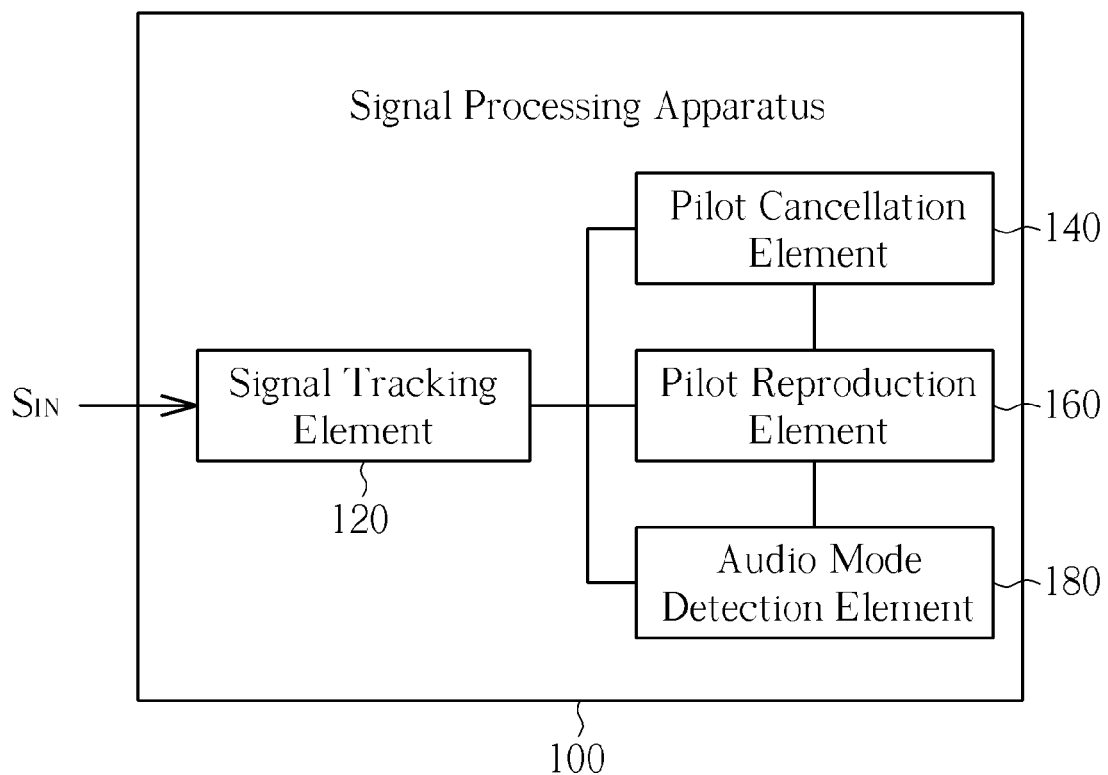
FIG. 1 is a block diagram of a signal processing apparatus for processing an input composite signal according to an embodiment of the present invention.

Please refer to FIG. 1. FIG. 1 is a block diagram of a signal processing apparatus 100 for processing an input composite signal $S_{IN}$ according to an embodiment of the present invention. The signal processing apparatus 100 includes, but is not limited to, a signal tracking element 120, a pilot cancellation element 140, a pilot reproduction element 160, and an audio mode detection element 180. The signal tracking element 120 is used for tracking a signal component of the input composite signal $S_{IN}$ according to a frequency of a pilot signal to generate a locked signal. The pilot reproduction element 160 is coupled to the signal tracking element 120, the pilot cancellation element 140, and the audio mode detection element 180 for generating a reproduced pilot signal according to a detecting result and the locked signal. The pilot cancellation element 140 is coupled to the signal tracking element 120 and the pilot reproduction element 160 for subtracting the reproduced pilot signal from the input composite signal $S_{IN}$ to thereby remove the pilot signal in the input composite signal $S_{IN}$. The audio mode detection element 180 is coupled to the signal tracking element 120 and the pilot reproduction element 160 for detecting an audio mode of the input composite signal $S_{IN}$. The configurations and related operations of the signal tracking element 120, the pilot cancellation element 140, the pilot reproduction element 160, and the audio mode detection element 180 will be explained in more detail in the following embodiments.

Please note that, the abovementioned elements can be implemented by hardware, software, firmware, DSP, or ASIC, but this should not be a limitation of the present invention, they can also be implemented in other manners. Furthermore, a mechanism for synchronizing the pilot signal and detecting the audio mode can be achieved by utilizing the signal processing apparatus 100 in conjunction with related signals.

Figure 2:
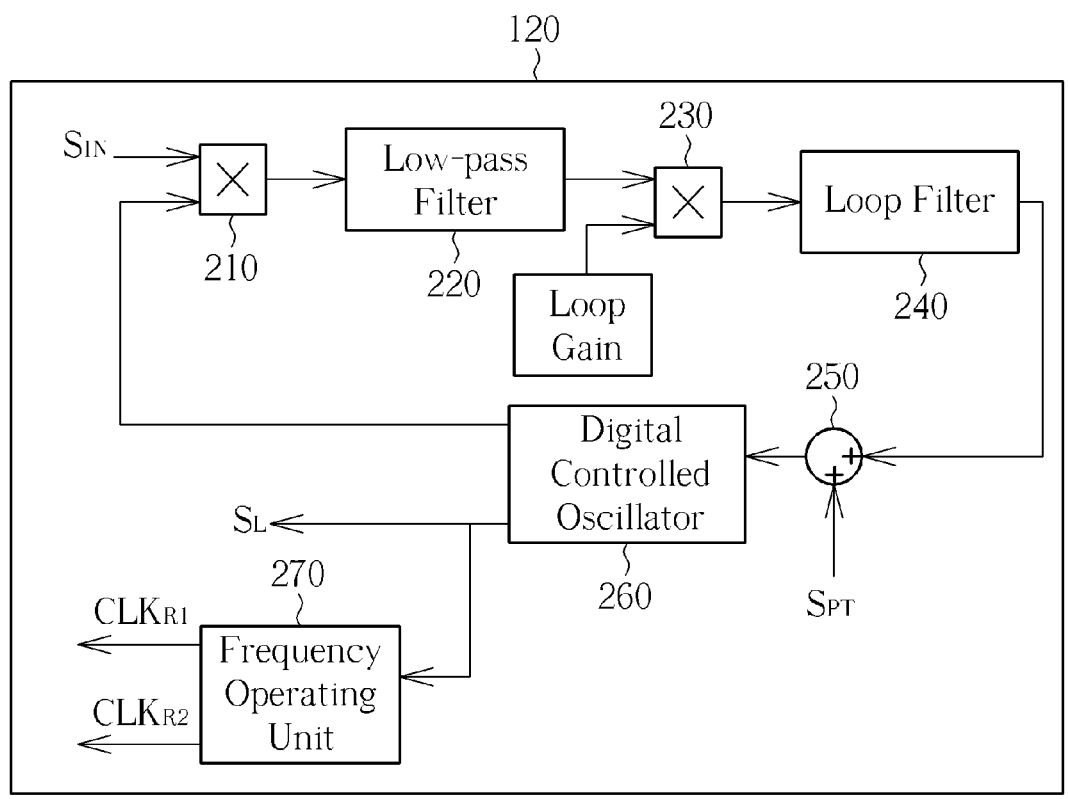
FIG. 2 is a diagram of an example of the signal tracking element shown in FIG. 1.

Please refer to FIG. 2. FIG. 2 is a diagram of an example of the signal tracking element 120 shown in FIG. 1. As shown in FIG. 2, the signal tracking element 120 includes (but is not limited to) a first mixer 210, a low-pass filter 220, a second mixer 230, a loop filter 240, an adder 250, a digitally controlled oscillator 260, and a frequency operating unit 270. In this example, the signal tracking element 120 is implemented by an ADPLL. The ADPLL receives the composite signal $S_{IN}$ and then the tracking a signal component of the composite signal $S_{IN}$ according to a frequency $f_P$ of a pilot signal $S_{PT}$ to generate a locked signal $S_L$, wherein a frequency and a phase of the locked signal $S_L$ are substantially identical to the frequency $f_P$ and a phase of the pilot signal $S_{PT}$ of the received composite signal $S_{IN}$. In other words, the locked signal $S_L$ and the pilot signal $S_{PT}$ are synchronized and have the same frequency and the same phase but different amplitudes. In addition, the frequency operating unit 270 is used for respectively performing a frequency multiplication operation and a frequency division operation on the locked signal $S_L$ to respectively generate reference clock signals $CLK_{R1}$ and $CLK_{R2}$, which are provided for subsequent demodulations.

Figure 3:
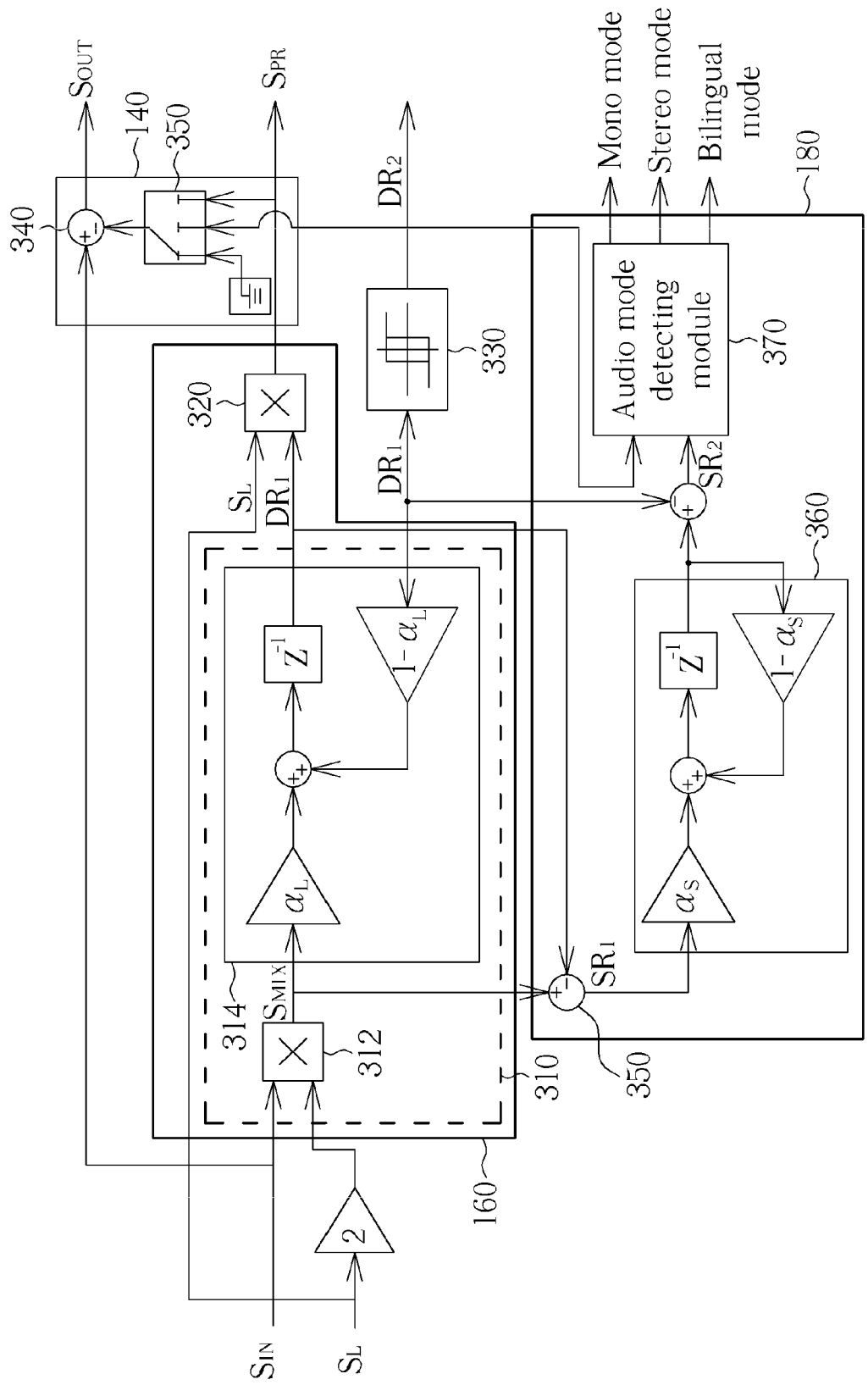
FIG. 3 is a diagram of an example of the pilot cancellation element, the pilot reproduction element, and the audio module detection element shown in FIG. 1.

Please refer to FIG. 3. FIG. 3 is a diagram of an example of the pilot cancellation element 140, the pilot reproduction element 160, and the audio module detection element 180 shown in FIG. 1. The pilot reproduction element 160 includes an amplitude detecting module 310 and a pilot reproducing module 320. The amplitude detecting module 310 includes a mixer 312 and a filter 314. The mixer 312 performs a mixing operation according to the input composite signal $S_{IN}$ and the locked signal $S_L$ to generate a mixed signal $S_{MIX}$. The filter 314 is coupled to the mixer 312 for performing a specific filtering operation upon the mixed signal $S_{MIX}$ to generate a detecting result $DR_1$ related to the amplitude of the pilot signal $S_{PT}$. The pilot reproducing module 320, which is implemented by a mixer in this example, is coupled to the filter 314 of the amplitude detecting module 310 for generating a reproduced pilot signal $S_{PR}$ according to the detecting result $DR_1$ and the locked signal $S_L$. In other words, the reproduced pilot signal $S_{PR}$ and the pilot signal $S_{PT}$ are exactly the same and have the same frequency, the same phase, and the same amplitude.

Please keep referring to FIG. 3. The signal processing apparatus 100 further includes a comparator 330 coupled to the amplitude detecting module 310 for comparing the detecting result $DR_1$ with a predetermined threshold value to determine if the signal component is the pilot signal $S_{PT}$. The pilot cancellation element 140 has a subtractor 340 and a selector 350. The subtractor 340 is coupled to the input composite signal $S_{IN}$ and the selector 350. The selector 350 is coupled to the pilot reproducing module 160 and the comparator 330 for selecting whether to transmit the reproduced pilot signal $S_{PR}$ to the subtractor 340 according to a determining result $DR_2$ of the comparator 330. When the signal component is determined to be the pilot signal $S_{PT}$, the subtractor 340 subtracts the reproduced pilot signal $S_{PR}$ from the input composite signal $S_{IN}$ to thereby remove the pilot signal $S_{PT}$ in the input composite signal $S_{IN}$ and generate an output composite signal $S_{OUT}$. When the signal component is not determined as the pilot signal $S_{PT}$, the subtractor 340 will not subtract the reproduced pilot signal $S_{PR}$ from the input composite signal $S_{IN}$. Furthermore, the determining result $DR_2$ of the comparator 330 can also be used for determining an audio mode if the input composite signal $S_{IN}$ complies with a Broadcast Television System Committee (BTSC) standard or an FM radio standard. When there exists the pilot signal in the input composite signal $S_{IN}$ complies with these two standards, the audio mode is determined as stereo mode. When the pilot signal does not exist in the input composite signal $S_{IN}$ complying with these two standards, the audio mode is determined as mono mode.

Please keep referring to FIG. 3. The audio mode detection element 180 includes a second subtractor 350, a second filter 360, and an audio mode detecting module 370. The second subtractor 350 is used for subtracting the detecting result $DR_1$ from the mixed signal $S_{MIX}$ to generate a first result $SR_1$. The second filter 360 then performs a second filtering operation upon the first result $SR_1$ for filtering out signal components with high frequencies to generate a second result $SR_2$, which indicates a predetermined control signal for modulating the pilot signal $S_{PT}$ of the input composite signal $S_{IN}$. Finally, the audio mode detecting module 370 detects the audio mode (mono mode, stereo mode, or bilingual mode) of the input composite signal $S_{IN}$ according to the second result $SR_2$ and the determining result $DR_2$ of the comparator 330.

Please note that, the abovementioned comparator 330 can be a hysteresis comparator, and those skilled in the art should know that this is not a limitation of the present invention. In addition, the audio mode detecting module 370 can be divided into four parts including a 90° phase shifting generator, a square-wave generator, a correlator, and a hysteresis comparator. The sub-elements and related operations of the audio mode detecting module 370 will be explained in detail in the following embodiments.

Figure 4:
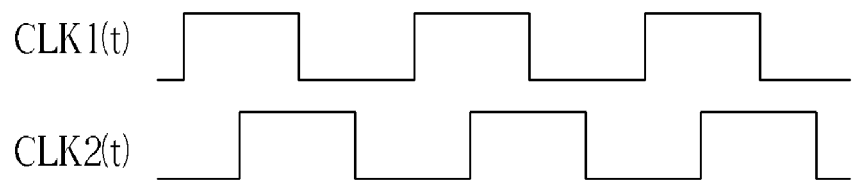
FIG. 4 (including 4A and 4B) is a diagram of a 90 degree phase shifting generator according to an embodiment of the present invention.
Figure 4:
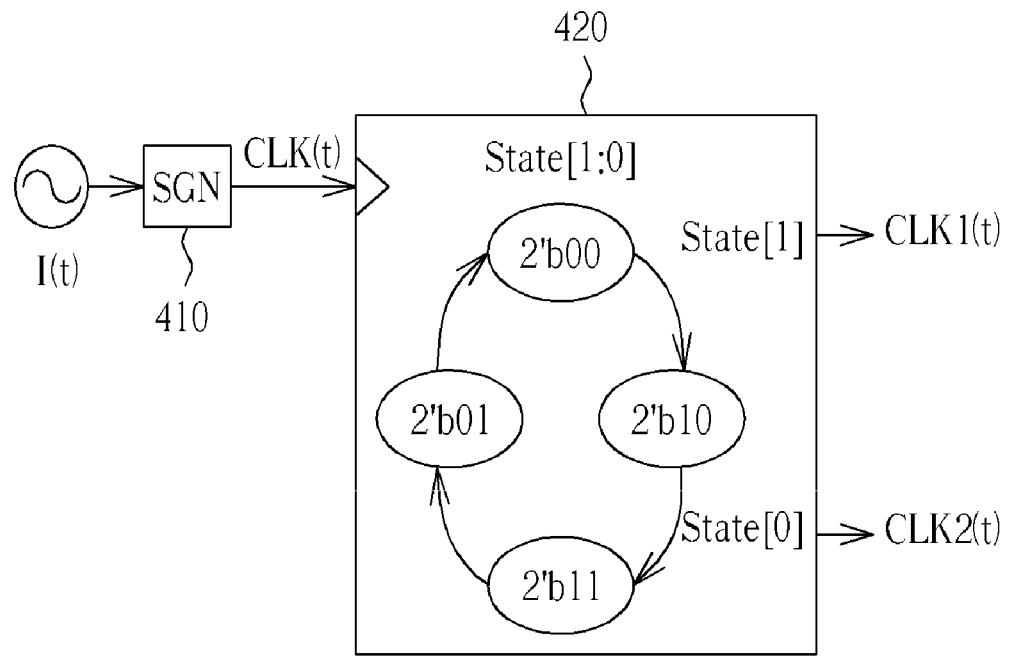

Please refer to FIG. 4. FIG. 4 (including 4A and 4B) is a diagram of a 90° phase shifting generator according to an embodiment of the present invention. As shown in 4A, two clock signals $CLK1(t)$ and $CLK2(t)$ having the same frequency and the same duty cycle (50%) are in 90° phase shift. The two clock signals $CLK1(t)$ and $CLK2(t)$ can be generated in a manner shown in 4B. A sine signal (or a cosine signal) I(t) is transformed into a square-wave signal CLK(t) by a sgn function 410, and a state machine generator 420 with two bits then generates the clock signals $CLK1(t)$ and $CLK2(t)$ according to the square signal CLK(t).

Figure 5:
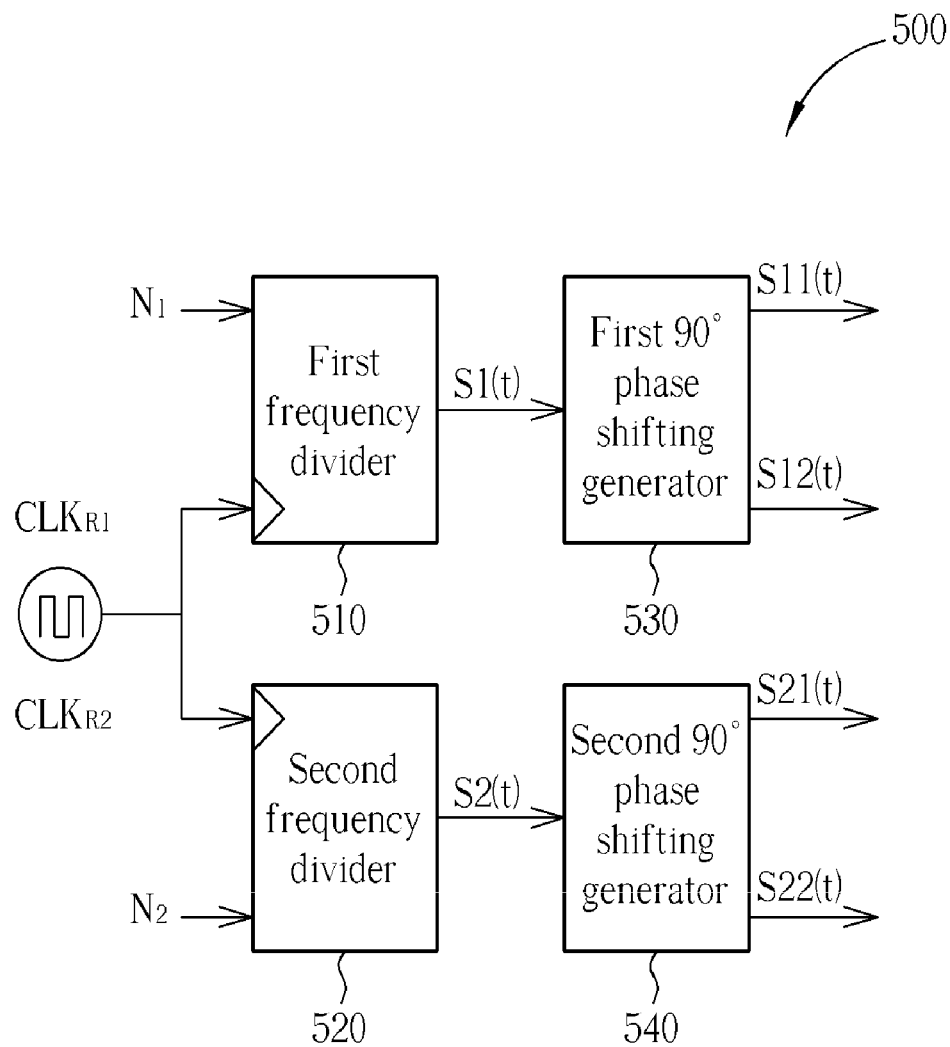
FIG. 5 is a diagram of a square-wave generator according to an embodiment of the present invention.

Please refer to FIG. 5. FIG. 5 is a diagram of a square-wave generator 500 according to an embodiment of the present invention. The reference clock signal $CLK_{R1}$ or $CLK_{R2}$, obtained from the frequency operating unit 270 shown in FIG. 2, is used as a clock source of the square-wave generator 500. The square-wave generator 500 includes a first frequency divider 510, a second frequency divider 520, a first 90° phase shifting generator 530, and a second 90° phase shifting generator 540. The first frequency divider 510 divides a frequency of the reference clock signal $CLK_{R1}$ or $CLK_{R2}$ by a first particular divisor $N_1$ to generate a first frequency-divided signal $S1(t)$. The first 90° phase shifting generator 530 then generates clock signals $S11(t)$ and $S12(t)$ according to the first frequency-divided signal $S1(t)$, wherein a phase difference between the clock signal $S11(t)$ and the clock signal $S12(t)$ is substantially equal to 90 degrees. Similarly, the second frequency divider 520 divides the frequency of the reference clock signal $CLK_{R1}$ or $CLK_{R2}$ by a second particular divisor $N_2$ to generate a second frequency-divided signal $S2(t)$. The second 90° phase shifting generator 540 then generates clock signals $S21(t)$ and $S22(t)$ according to the second frequency-divided signal $S2(t)$, wherein a phase difference between the clock signal $S21(t)$ and the clock signal $S22(t)$ is substantially equal to 90 degrees.

Figure 6:
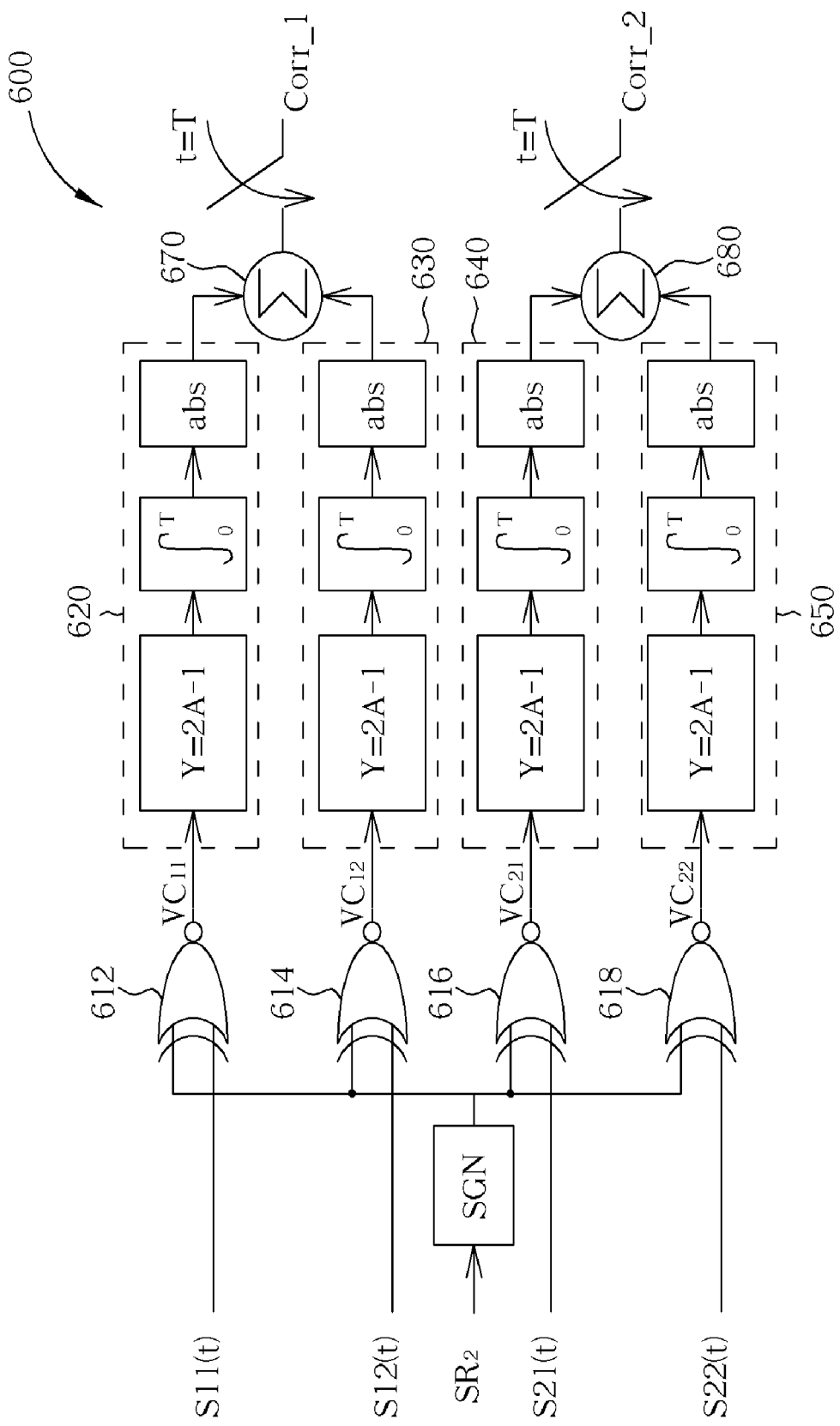
FIG. 6 is a diagram of a correlating unit according to an embodiment of the present invention.

Please refer to FIG. 6. FIG. 6 is a diagram of a correlating unit 600 according to an embodiment of the present invention. The correlating unit 600 includes four correlators 612-618, four operating sub-units 620-650, and two adders 670 and 680. The correlators 612 and 614 respectively perform a correlation operation upon the clock signals $S11(t)$ and $S12(t)$ together with the second result $SR_2$ to generate correlation values $VC_{11}$ and $VC_{12}$. The operating sub-units 620 and 630 then respectively perform a level transformation, an integration operation, and an absolute operation on the correlation values $VC_{11}$ and $VC_{12}$ to generate processed correlation value $VC_{11}'$ and $VC_{12}'$. After that, the adder 670 sums the processed correlation value $VC_{11}'$ and the processed correlation value $VC_{12}'$ to generate a summation result Corr_1. Similarly, the correlators 616 and 618 respectively perform a correlation operation upon the clock signals $S21(t)$ and $S22(t)$ together with the second result $SR_2$ to generate correlation values $VC_{21}$ and $VC_{22}$. The operating sub-units 640 and 650 then respectively perform a level transformation, an integration operation, and an absolute operation on the correlation values $VC_{21}$ and $VC_{22}$ to generate processed correlation values $VC_{21}'$ and $VC_{22}'$. After that, the adder 680 sums the processed correlation value $VC_{21}'$ and the processed correlation value $VC_{22}'$ to generate a summation result Corr_2.

Figure 7:
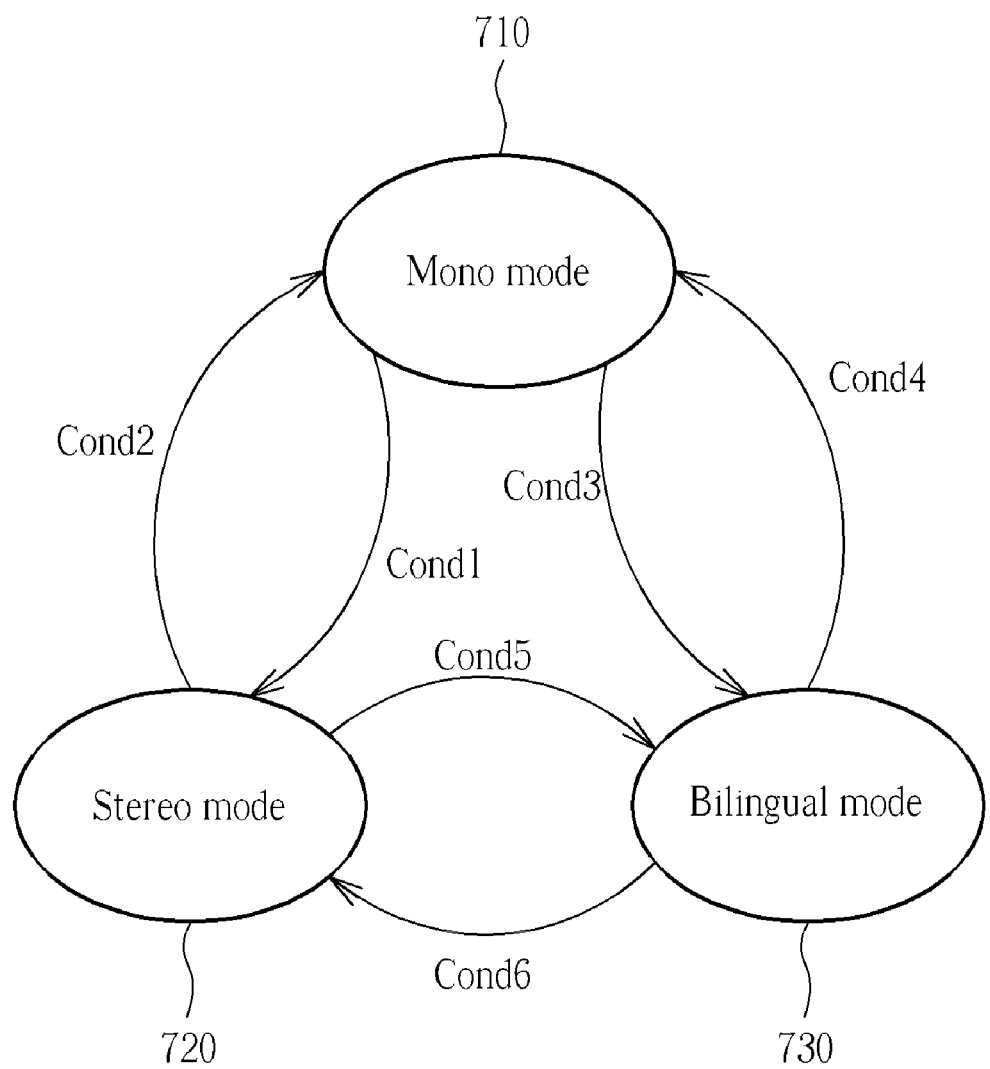
FIG. 7 is a diagram of a hysteresis comparator according to an embodiment of the present invention.

Please refer to FIG. 7. FIG. 7 is a diagram of a hysteresis comparator according to an embodiment of the present invention. The hysteresis comparator is coupled to the adders 670 and 680 shown in FIG. 6, and has a high predetermined threshold value TR_H and a low predetermined threshold value TH_L. The hysteresis comparator compares the summation results Corr_1 and Corr_2 with the high predetermined threshold value TR_H and the low predetermined threshold value TH_L to determine the audio mode of the input composite signal $S_{IN}$. As shown in FIG. 7, there are in total three audio modes including a mono mode 710, a stereo mode 720, and a bilingual mode 730. Let's assume that the summation result Corr_1 is related to the stereo mode 720 and the summation result Corre_2 is related to the bilingual mode 730. In the following, descriptions are divided into six conditions Cond1-Cond6. In the first condition Cond1, when the pilot signal $S_{PT}$ exists and the summation result Corr_1 is greater than the high predetermined threshold value TR_H, the audio mode is determined as the stereo mode 720. In a second condition Cond2, when the summation result Corr_1 is smaller than the low predetermined threshold value TH_L, the audio mode is determined as the mono mode 710. In a third condition Cond3, when the pilot signal $S_{PT}$ exists and the summation result Corr_2 is greater than the high predetermined threshold value TR_H, the audio mode is determined as the bilingual mode 730. In a fourth condition Cond4, when the summation result Corr_2 is smaller than the low predetermined threshold value TH_L, the audio mode is determined as the mono mode 710. In a fifth condition Cond5, when the pilot signal $S_{PT}$ is existed, the summation result Corr_1 is smaller than the low predetermined threshold value TH_L, and the summation result Corr_2 is greater than the high predetermined threshold value TR_H, the audio mode is determined as the bilingual mode 730. In a sixth condition Cond6, when the pilot signal $S_{PT}$ is existed, the summation result Corr_2 is smaller than the low predetermined threshold value TH_L, and the summation result Corr_1 is greater than the high predetermined threshold value TR_H, the audio mode is determined as the stereo mode 720.

Please note that the audio mode detecting module 370 is applied to the input composite signal $S_{IN}$ complying with an Electronic Industries Association of Japan (EIAJ) standard or an audio carrier-2 (A2) standard, but this is not a limitation of the present invention: it can also comply with other audio standards.

Figure 8:
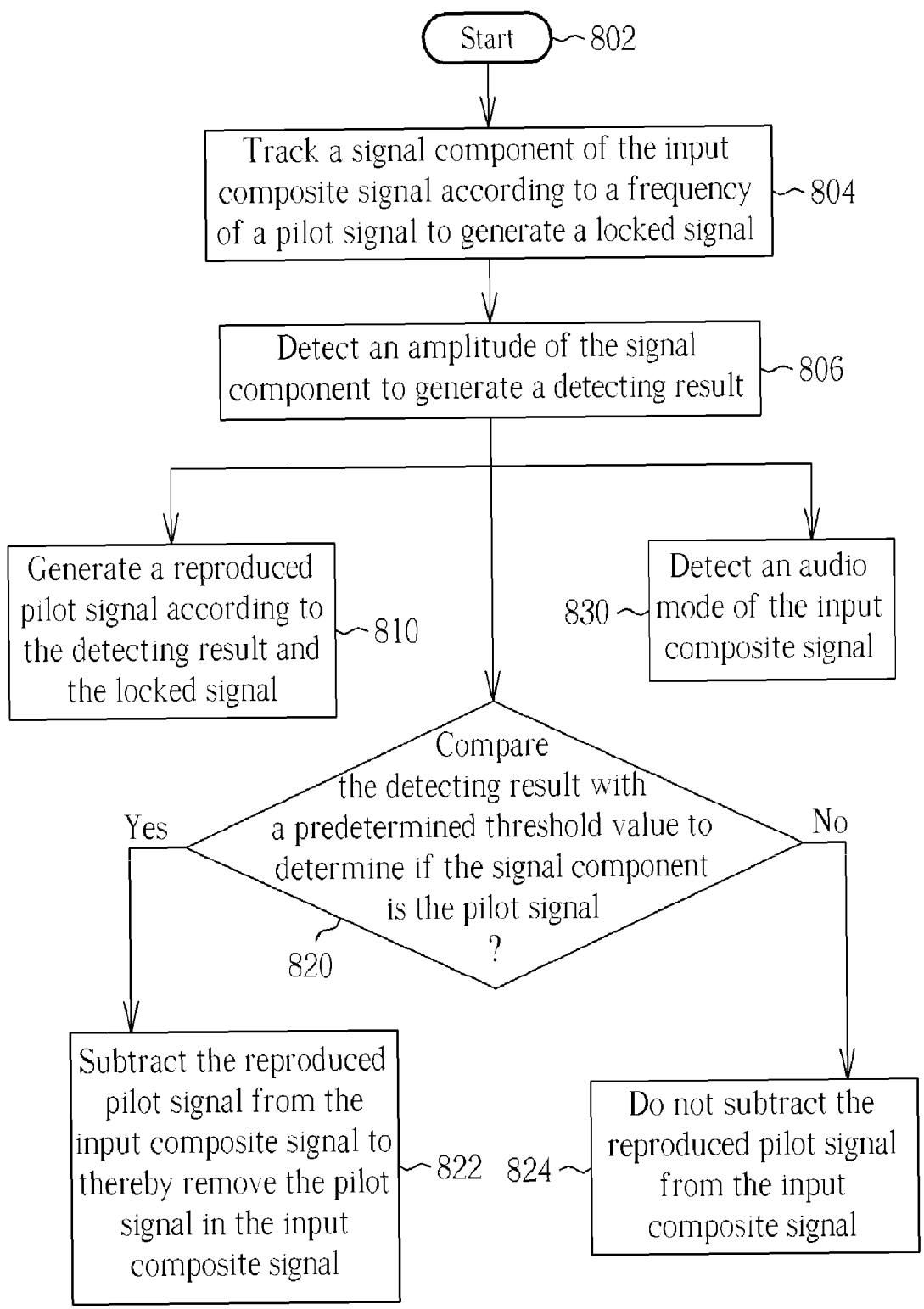
FIG. 8 is a flowchart illustrating a method for processing an input composite signal according to an embodiment of the present invention.

Please refer to FIG. 8. FIG. 8 is a flowchart illustrating a method for processing an input composite signal according to an embodiment of the present invention. The method includes, but is not limited to, the following steps:

Step 802: Start.

Step 804: Track a signal component of the input composite signal according to a frequency of a pilot signal to generate a locked signal, wherein a frequency and a phase of the locked signal are substantially identical to the frequency and a phase of the pilot signal.

Step 806: Detect an amplitude of the signal component to generate a detecting result.

Step 810: Generate a reproduced pilot signal according to the detecting result and the locked signal.

Step 820: Compare the detecting result with a predetermined threshold value to determine if the signal component is the pilot signal. When the signal component is determined to be the pilot signal, go to Step 822; otherwise, go to Step 824.

Step 822: Subtract the reproduced pilot signal from the input composite signal to thereby remove the pilot signal in the input composite signal.

Step 824: Do not subtract the reproduced pilot signal from the input composite signal.

Step 830: Detect an audio mode of the input composite signal.

Please refer to FIG. 8 together with FIG. 1 and FIG. 3. The following description details how each element operates by collocating the steps shown in FIG. 8 and the elements shown in FIG. 1 and FIG. 3. In Step 804, the signal tracking element 120 tracks the signal component of the input composite signal $S_{IN}$ according to the frequency $f_p$ of the pilot signal $S_{PT}$ to generate the locked signal $S_L$, wherein the frequency and the phase of the locked signal $S_L$ are substantially identical to the frequency and the phase of the pilot signal $S_{PT}$ of the received composite signal $S_{IN}$. In Steps 806, the amplitude detecting module 310 of the pilot reproduction element 160 detects the amplitude of the signal component to generate the detecting result $DR_1$. In the following, descriptions are divided into several situations. In a first situation (Step 810), the pilot reproducing module 320 of the pilot reproduction element 160 generates the reproduced pilot signal $S_{PR}$ according to the detecting result $DR_1$ and the locked signal $S_L$. In a second situation (Steps 820-824), the comparator 330 compares the detecting result $DR_1$ with a predetermined threshold value to determine if the signal component is the pilot signal $S_{PT}$. When the signal component is determined to be the pilot signal $S_{PT}$, the subtractor 340 of the pilot cancellation element 140 subtracts the reproduced pilot signal $S_{PR}$ from the input composite signal $S_{IN}$ to thereby remove the pilot signal $S_{PT}$ in the input composite signal $S_{IN}$ and generate an output composite signal $S_{OUT}$ (Step 822). When the signal component is not determined as the pilot signal $S_{PT}$, the subtractor 340 will not subtract the reproduced pilot signal $S_{PR}$ from the input composite signal $S_{IN}$ (Step 824). In a third situation, the audio mode detecting module 370 of the audio mode detection element 180 detects the audio mode (mono mode, stereo mode, or bilingual mode) of the input composite signal $S_{IN}$ according to the second result $SR_2$ and the determining result $DR_2$ of the comparator 330.

Figure 9:
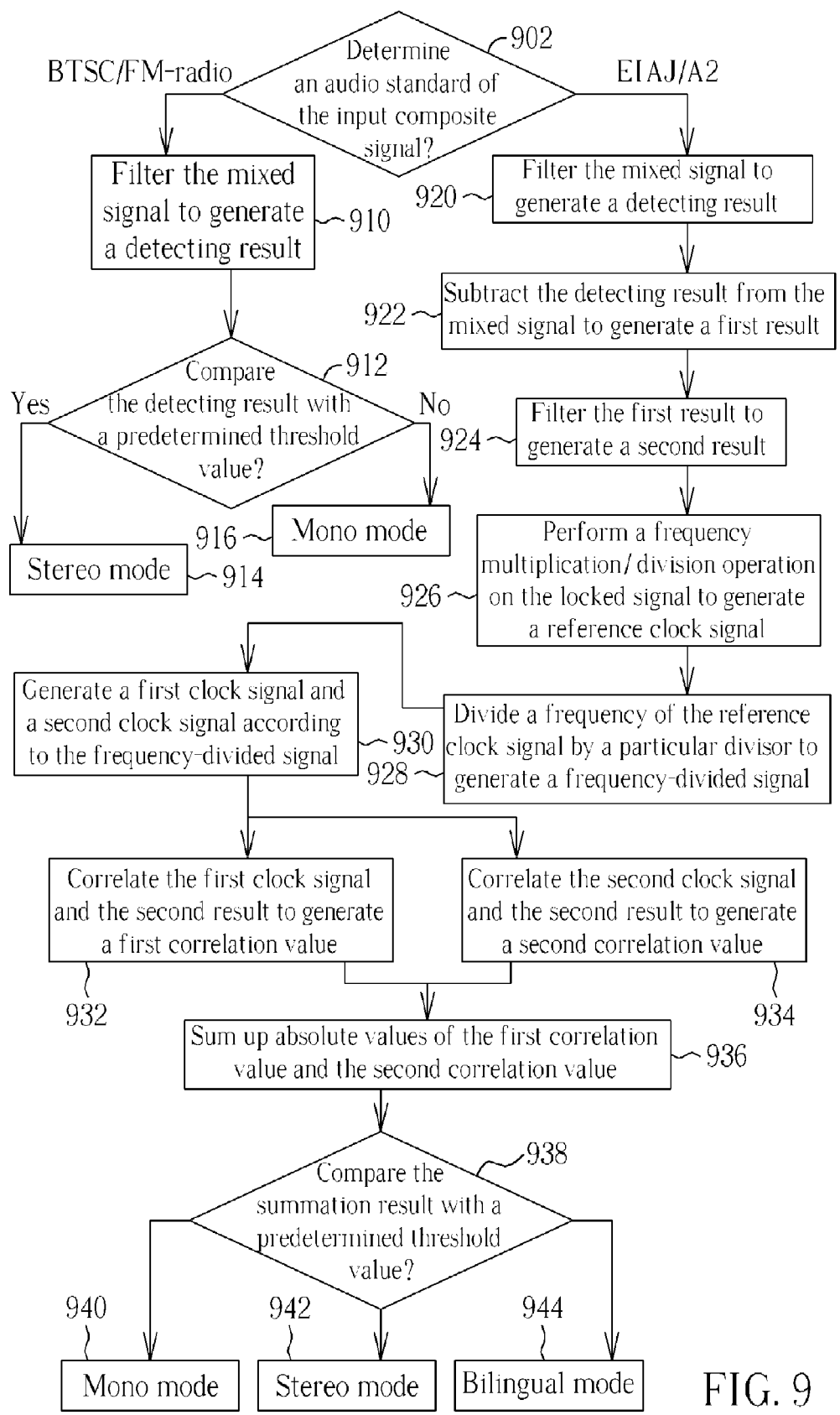
FIG. 9 is a flowchart illustrating the Step 830 shown in FIG. 8 in more detail.

Please refer to FIG. 9. FIG. 9 is a flowchart illustrating Step 830 shown in FIG. 8. The Step 830 is divided into the following steps:

Step 902: Determine an audio standard of the input composite signal. When the audio standard of the input composite signal complies with a BTSC standard or an FM radio standard, go to Step 910; and when the audio standard of the input composite signal complies with an EIAJ standard or an A2 standard, go to Step 920.

Step 910: Perform a specific filtering operation upon the mixed signal to generate a detecting result related to the amplitude of the signal component.

Step 912: Compare the detecting result with a predetermined threshold value to determine the audio mode of the input composite signal. When the detecting result is greater than a predetermined threshold value, go to Step 914; otherwise, go to Step 916.

Step 914: Determine the audio mode as stereo mode.

Step 916: Determine the audio mode as mono mode.

Step 920: Perform a first filtering operation upon the mixed signal to generate a detecting result related to the amplitude of the signal component.

Step 922: Subtract the detecting result from the mixed signal to generate a first result.

Step 924: Perform a second filtering operation upon the first result to generate a second result.

Step 926: Perform a frequency multiplication operation or a frequency division operation on the locked signal to generate a reference clock signal.

Step 928: Divide a frequency of the reference clock signal by a particular divisor to generate a frequency-divided signal.

Step 930: Generate a first clock signal and a second clock signal according to the frequency-divided signal, wherein the phase difference between the first clock signal and the second clock signal is substantially equal to 90 degrees.

Step 932: Perform a correlation operation upon the first clock signal and the second result to generate a first correlation value.

Step 934: Performing a correlation operation upon the second clock signal and the second result to generate a second correlation value.

Step 936: Sum up absolute values of the first correlation value and the second correlation value to generate a summation result.

Step 938: Compare the summation result with a predetermined threshold value to generate a comparing result to determine the audio mode of the input composite signal. When the comparing result complies with the condition Cond2 or Cond4, go to Step 940; when the comparing result complies with the condition Cond1 or Cond6, go to Step 942; and when the comparing result complies with the condition Cond3 or Cond5, go to Step 944.

Step 940: Determine the audio mode as mono mode.

Step 942: Determine the audio mode as stereo mode.

Step 944: Determine the audio mode as bilingual mode.

Please refer to FIG. 9 together with FIG. 3 through FIG. 7. The following description details how each element operates by collocating the steps shown in FIG. 9 and the elements shown in FIG. 3 through FIG. 7. At first, the audio standard of the input composite signal $S_{IN}$ is determined. In the following, descriptions are divided into two situations.

In a first situation, when the audio standard of the input composite signal $S_{IN}$ is determined as BTSC or FM radio standard, go to Steps 910-916. In Step 910, the filter 314 of the amplitude detecting module 310 performs a specific filtering operation on the mixed signal $S_{MIX}$ to generate the detecting result $DR_1$ related to the amplitude of the pilot signal $S_{PT}$. The comparator 330 then compares the detecting result $DR_1$ with a predetermined threshold value to determine if the signal component is the pilot signal $S_{PT}$ (Step 912). When the detecting result $DR_1$ is greater than the predetermined threshold value, the audio mode is determined as stereo mode (Step 914). When the detecting result $DR_1$ is smaller than the predetermined threshold value, the audio mode is determined as mono mode (Step 916).

In a second situation, when the audio standard of the input composite signal $S_{IN}$ is determined as EIAJ or A2 standard, go to Steps 920-944. The operations of Steps 920-924 are already detailed in FIG. 3, the operations of Steps 926-930 are already detailed in FIG. 5 and FIG. 4, the operations of Steps 932-936 are already detailed in FIG. 6, the operations of Steps 938-944 are already detailed in FIG. 7, and further description is omitted here for brevity.

Provided that substantially the same result is achieved, the steps of the method shown in FIG. 8 and FIG. 9 need not be in the exact order shown and need not be contiguous: other steps can be intermediate.

Figure 10:
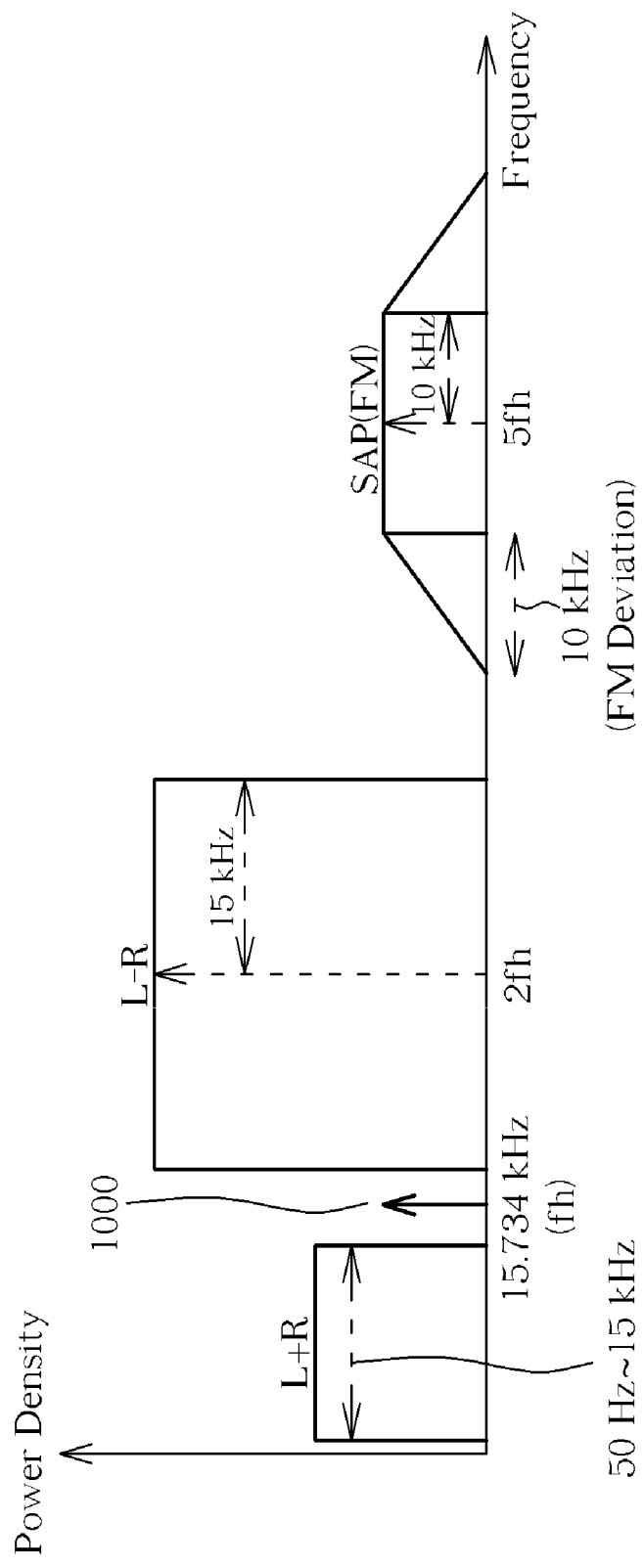
FIG. 10 is a frequency spectrum diagram for a BTSC format signal.

In the following, several embodiments illustrate the pilot recovery and audio mode detection mechanism disclosed in the present invention. Please refer to FIG. 10. FIG. 10 is a frequency spectrum diagram for a BTSC format signal. As shown in FIG. 10, a signal "L+R" is located at a frequency of 50 Hz-15 kHz, a pilot signal 1000 is located at a frequency of 15.734 KHz (represented by "fh"), a center point of a signal "L−R" is located at a frequency 2fh, and a center point of a signal SAP is located at a frequency 5fh. When the BTSC format signal is transmitted by a transmitter in mono mode, only the signal "L+R" is transmitted; when the BTSC format signal is transmitted by the transmitter in stereo mode, the signals "L+R" and "L−R" and the pilot signal 1000 are transmitted; and when the BTSC format signal is transmitted by the transmitter in bilingual mode, the signal "SAP" is further transmitted. Therefore, a receiver can detect the audio mode of the BTSC format signal by detecting whether the pilot signal 1000 exists, which can be implemented by the determining result $DR_2$ of the comparator 330 shown in FIG. 3.

Figure 11:
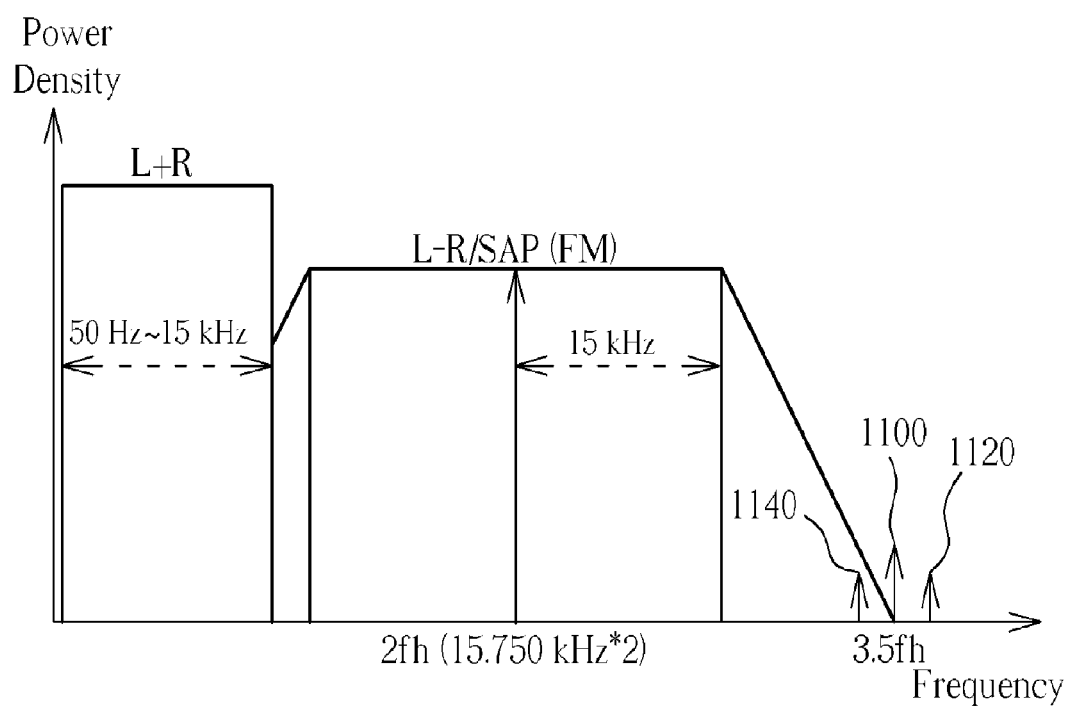
FIG. 11 is a frequency spectrum diagram for an EIAJ format signal.

Please refer to FIG. 11. FIG. 11 is a frequency spectrum diagram for an EIAJ format signal. As shown in FIG. 11, a signal "L+R" is located at a frequency of 50 Hz-15 kHz, a center point of a signal "L−R" or SAP is located at a frequency 2fh, and a pilot signal 1100 is located at a frequency 3.5fh. A first modulated pilot signal 1120 and a second modulated pilot signal 1140 are respectively located at a frequency near the pilot signal 1100, wherein the first modulated pilot signal 1120 is generated by modulating the pilot signal 1100 by an AM signal having a frequency of 982.5 Hz, and the second modulated pilot signal 1140 is generated by modulating the pilot signal 1100 by an AM signal having a frequency of 922.5 Hz. When the EIAJ format signal is transmitted by a transmitter in mono mode, only the signal "L+R" and the pilot signal 1100 are transmitted (if the pilot signal 1100 exists); when the EIAJ format signal is transmitted by the transmitter in stereo mode, the signals "L+R" and "L−R" and the first modulated pilot signal 1120 are transmitted; and when the EIAJ format signal is transmitted by the transmitter in bilingual mode, the signals "L+R" and "L−R" and the second modulated pilot signal 1140 are transmitted. Therefore, a receiver can detect the audio mode of the EIAJ format signal by detecting whether the pilot signal 1100 exists and by determining which AM signal is used for modulating the pilot signal, which can be implemented by the audio mode detecting module 370 shown in FIG. 3.

Please refer to FIG. 12. FIG. 12 is a parameter table illustrating each parameter of the different audio modes in the different standards shown in FIG. 5. In FIG. 12, the parameters of the reference clock signals $CLK_{R1}$ and $CLK_{R2}$ in different standards are shown, including the first particular divisor $N_1$ and the second particular divisor $N_2$. By applying these parameters to FIG. 5 according to different audio modes in different standards, the corresponding clock signals can be obtained for the follow-up correlation operations.

The abovementioned embodiments are presented merely for describing the present invention, and in no way should be considered to be limitations of the scope of the present invention. In summary, the present invention provides a method for processing an input composite signal and related signal processing apparatus. The method and the apparatus of the present invention are related to a pilot recovery and audio mode detection mechanism implemented by a statistics algorithm, which is a digital algorithm and can be implemented under low operations. Through the signal tracking element 120, the pilot cancellation element 140, the pilot reproduction element 160, and the audio mode detection element 180 in conjunction with related signals, not only can the pilot signal of the input composite signal $S_{IN}$ be tracked and synchronized but the audio mode (i.e., mono, stereo, and bilingual modes) of different audio standards can also be detected. In addition, the present invention can be implemented by hardware, software, firmware, DSP, ASIC, or other manner, and need not incur high costs.

Those skilled in the art will readily observe that numerous modifications and alterations of the device and method may be made while retaining the teachings of the invention.

What is claimed is:

1. A method for processing an input composite signal, comprising:
   tracking a signal component of the input composite signal according to a frequency of a pilot signal to generate a locked signal, wherein a frequency and a phase of the locked signal are substantially identical to the frequency and a phase of the pilot signal;
   detecting an amplitude of the signal component to generate a detecting result; and
   generating a reproduced pilot signal according to the detecting result and the locked signal.

2. The method of claim 1, wherein the step of detecting the amplitude of the signal component to generate the detecting result comprises:
   performing a mixing operation according to the input composite signal and the locked signal to generate a mixed signal; and
   performing a specific filtering operation upon the mixed signal to generate the detecting result.

3. The method of claim 1, further comprising:
   comparing the detecting result with a predetermined threshold value to determine if the signal component is the pilot signal.

4. The method of claim 3, further comprising:
   when the signal component is determined to be the pilot signal, subtracting the reproduced pilot signal from the input composite signal to thereby remove the pilot signal in the input composite signal.

5. The method of claim 1, wherein the input composite signal complies with a Broadcast Television System Committee (BTSC) standard, an FM radio standard, an Electronic Industries Association of Japan (EIAJ) standard, or an audio carrier-2 (A2) standard.

6. A method for processing an input composite signal, comprising:
   tracking a signal component of the input composite signal according to a frequency of a pilot signal to generate a locked signal, wherein a frequency and a phase of the locked signal are substantially identical to the frequency and a phase of the pilot signal;
   performing a mixing operation according to the input composite signal and the locked signal to generate a mixed signal; and
   detecting an audio mode of the input composite signal according to the mixed signal.

7. The method of claim 6, wherein the step of detecting the audio mode of the input composite signal comprises:
   performing a specific filtering operation upon the mixed signal to generate a detecting result related to an amplitude of the signal component; and
   comparing the detecting result with a predetermined threshold value to determine the audio mode of the input composite signal.

8. The method of claim 7, wherein the input composite signal complies with a Broadcast Television System Committee (BTSC) standard or an FM radio standard.

9. The method of claim 6, wherein detecting the audio mode of the input composite signal comprises:

performing a first filtering operation upon the mixed signal to generate a detecting result related to an amplitude of the signal component;

subtracting the detecting result from the mixed signal to generate a first result;

performing a second filtering operation upon the first result to generate a second result; and detecting the audio mode of the input composite signal according to the second result.

10. The method of claim 9, wherein the step of detecting the audio mode of the input composite signal according to the second result comprises:

performing a frequency multiplication operation or a frequency division operation on the locked signal to generate a reference clock signal; and detecting the audio mode of the input composite signal according to the second result and the reference clock signal.

11. The method of claim 10, wherein the step of detecting the audio mode of the input composite signal according to the second result and the reference clock signal comprises:

dividing a frequency of the reference clock signal by a particular divisor to generate a frequency-divided signal;

generating a first clock signal and a second clock signal according to the frequency-divided signal, wherein a phase difference between the first clock signal and the second clock signal is substantially equal to 90 degrees; and detecting the audio mode of the input composite signal according to the second result, the first clock signal, and the second clock signal.

12. The method of claim 11, wherein the step of detecting the audio mode of the input composite signal according to the second result, the first clock signal, and the second clock signal comprises:

performing a correlation operation upon the first clock signal and the second result to generate a first correlation value;

performing a correlation operation upon the second clock signal and the second result to generate a second correlation value;

summing up absolute values of the first correlation value and the second correlation value to generate a summation result; and comparing the summation result with a predetermined threshold value to determine the audio mode of the input composite signal.

13. The method of claim 9, wherein the input composite signal complies with an Electronic Industries Association of Japan (EIAJ) standard or an audio carrier-2 (A2) standard.

14. A signal processing apparatus for processing an input composite signal, comprising:

a signal tracking element, for tracking a signal component of the input composite signal according to a frequency of a pilot signal to generate a locked signal, wherein a frequency and a phase of the locked signal are substantially identical to the frequency and a phase of the pilot signal; and a pilot reproduction element, comprising:

an amplitude detecting module, for detecting an amplitude of the signal component to generate a detecting result; and a pilot reproducing module, coupled to the signal tracking element and the amplitude detecting module, for generating a reproduced pilot signal according to the detecting result and the locked signal.

15. The signal processing apparatus of claim 14, wherein the amplitude detecting module comprises:

a mixer, for performing a mixing operation according to the input composite signal and the locked signal to generate a mixed signal; and a filter, coupled to the mixer, for performing a specific filtering operation upon the mixed signal to generate the detecting result.

16. The signal processing apparatus of claim 14, further comprising:

a comparator, coupled to the amplitude detecting module, for comparing the detecting result with a predetermined threshold value to determine if the signal component is the pilot signal.

17. The signal processing apparatus of claim 16, further comprising:

a pilot cancellation element, having a subtractor coupled to the input composite signal, the pilot reproducing module, and the comparator, for subtracting the reproduced pilot signal from the input composite signal to thereby remove the pilot signal in the input composite signal when the signal component is determined to be the pilot signal.

18. A signal processing apparatus for processing an input composite signal, comprising:

a signal tracking element, for tracking a signal component of the input composite signal according to a frequency of a pilot signal to generate a locked signal, wherein a frequency and a phase of the locked signal are substantially identical to the frequency and a phase of the pilot signal;

a pilot reproduction element, having a mixer coupled to the input composite signal and the signal tracking element for performing a mixing operation according to the input composite signal and the locked signal to generate a mixed signal; and an audio mode detection element, coupled to the input composite signal and the mixer, for detecting an audio mode of the input composite signal according to the mixed signal.

19. The signal processing apparatus of claim 18, wherein the pilot reproduction element comprises:

a filter, for performing a specific filtering operation upon the mixed signal to generate a detecting result related to an amplitude of the signal component; and the signal processing apparatus further comprises a comparator coupled to the filter for comparing the detecting result with a predetermined threshold value to determine the audio mode of the input composite signal.

20. The signal processing apparatus of claim 18, wherein the pilot reproduction element comprises:

a first filter, for performing a first filtering operation upon the mixed signal to generate a detecting result related to an amplitude of the signal component;

and the audio mode detection element comprises:

a subtractor, for subtracting the detecting result from the mixed signal to generate a first result;

a second filter, for performing a second filtering operation upon the first result to generate a second result; and an audio mode detecting module, coupled to the second filter, for detecting the audio mode of the input composite signal according to the second result.

21. The signal processing apparatus of claim 20, further comprising:

a frequency operating unit, for performing a frequency multiplication operation or a frequency division operation on the locked signal to generate a reference clock signal;

wherein the audio mode detecting module detects the audio mode of the input composite signal according to the second result and the reference clock signal.

22. The signal processing apparatus of claim 21, wherein the audio mode detecting module comprises:
a frequency divider, for dividing a frequency of the reference clock signal by a particular divisor to generate a frequency-divided signal; and
a 90-degree phase shifting generator, for generating a first clock signal and a second clock signal according to the frequency-divided signal, wherein a phase difference between the first clock signal and the second clock signal is substantially equal to 90 degrees;
wherein the audio mode detecting module detects the audio mode of the input composite signal according to the second result, the first clock signal, and the second clock signal.

23. The signal processing apparatus of claim 22, wherein the audio mode detecting module comprises:
a correlating unit, comprising:
a first correlator, for performing a correlation operation upon the first clock signal and the second result to generate a first correlation value;
a second correlator, for performing a correlation operation upon the second clock signal and the second result to generate a second correlation value; and
an adder, coupled to the first correlator and the second correlator, for summing up absolute values of the first correlation value and the second correlation value to generate a summation result; and
a comparator, coupled to the adder, for comparing the summation result with a predetermined threshold value to determine the audio mode of the input composite signal.

* * * * *

UNITED STATES PATENT AND TRADEMARK OFFICE
CERTIFICATE OF CORRECTION

| | | |
|---|---|---|
| PATENT NO. | : 8,964,991 B2 | Page 1 of 1 |
| APPLICATION NO. | : 12/141073 | |
| DATED | : February 24, 2015 | |
| INVENTOR(S) | : Tien-Ju Tsai et al. | |

It is certified that error appears in the above-identified patent and that said Letters Patent is hereby corrected as shown below:

On the title page, item (73), correct the name of the assignee from "HIMAX TEHNOLOGIES LIMTED" to --HIMAX TECHNOLOGIES LIMITED--.

Signed and Sealed this
Sixteenth Day of June, 2015

Michelle K. Lee
*Director of the United States Patent and Trademark Office*